Oct. 6, 1964 N. DYSART 3,151,692
LOAD MEASURING APPARATUS FOR VEHICLES
Filed Oct. 23, 1962 2 Sheets-Sheet 1

NORMAN DYSART
INVENTOR.

BY *Lyon+Lyon*
ATTORNEYS

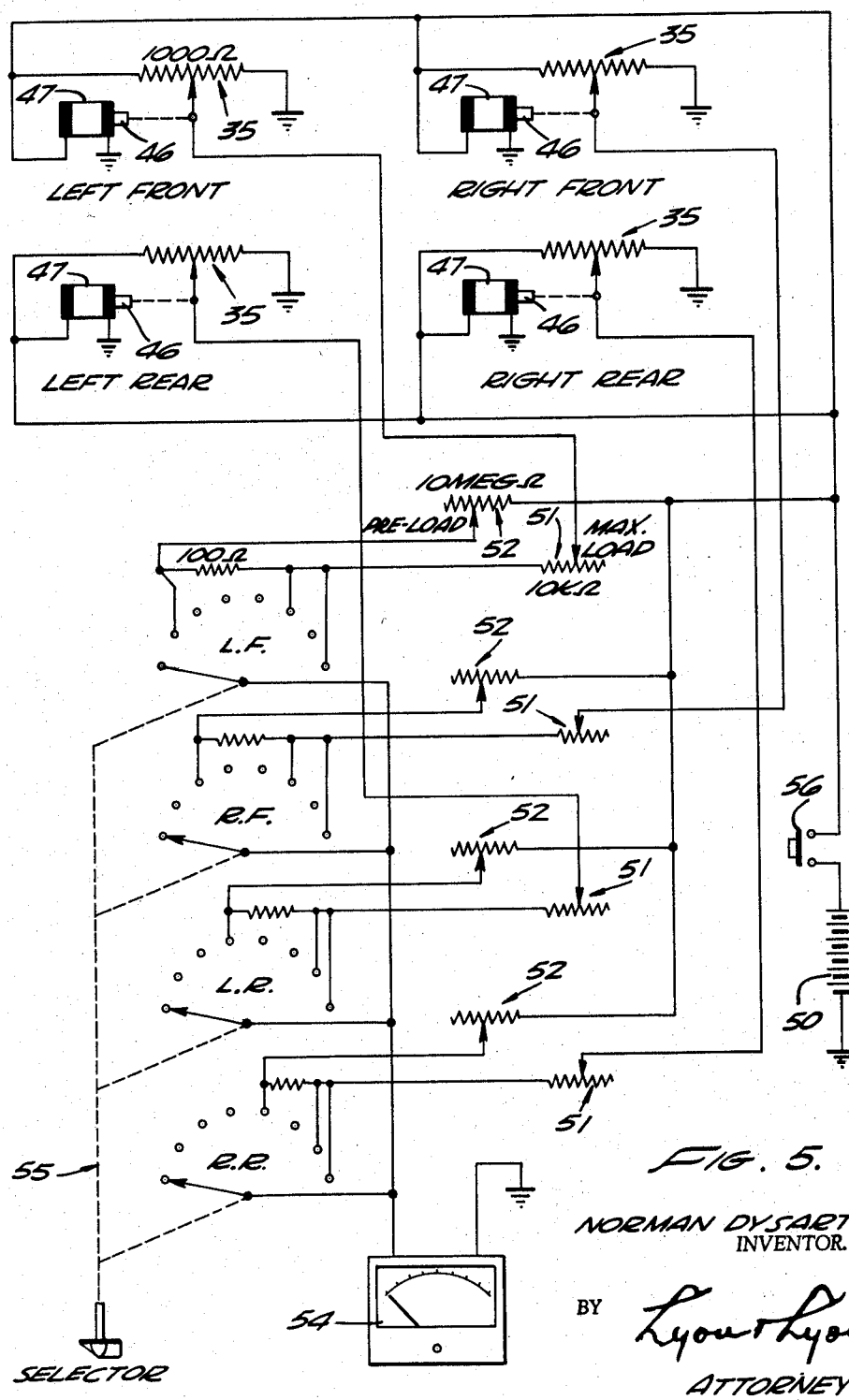

United States Patent Office 3,151,692
Patented Oct. 6, 1964

3,151,692
LOAD MEASURING APPARATUS FOR VEHICLES
Norman Dysart, 8120 Highway 60–66, Amarillo, Tex.
Filed Oct. 23, 1962, Ser. No. 232,545
4 Claims. (Cl. 177—138)

This invention relates to an electrical device for determining the loaded weight of a vehicle and the distribution of weight over each wheel as well as the distribution of weight over the front and rear axles.

This invention contemplates the provision of apparatus mounted on the vehicle and which takes advantage of the deflection of the vehicle springs under load to provide a visual indication of the load carried on each wheel or any predetermined grouping of wheels.

An important feature of this invention resides in the construction which avoids constant movement of the load measuring and indicating parts while the vehicle is in motion, thereby prolonging the service life of the device.

Briefly stated, a typical installation may include a part mounted for movement adjacent each of the wheels of a truck, together with linkage moving the part in accordance with deflection of the load-carrying spring adjacent each wheel. An electrical device is provided for measuring the position of said movable part, and a lost-motion connection is interposed between the measuring device and the movable part. A mechanical connection is established between the movable part and the electrical measuring apparatus only when visual indication of the magnitude of the load is required.

The principal object of this invention is to provide a novel form of load measuring and indicating device for a wheeled vehicle.

Another object is to provide a device of this type in which the load measuring and indicating parts are inactive until energized so that a part moving in response to spring action of the vehicle may move independently of the load measuring and indicating apparatus.

Another object is to provide a novel form of electrically operated load measuring and indicating apparatus.

Other and more detailed objects will appear hereinafter:

FIGURE 5 is a wiring diagram.

Figure 1:
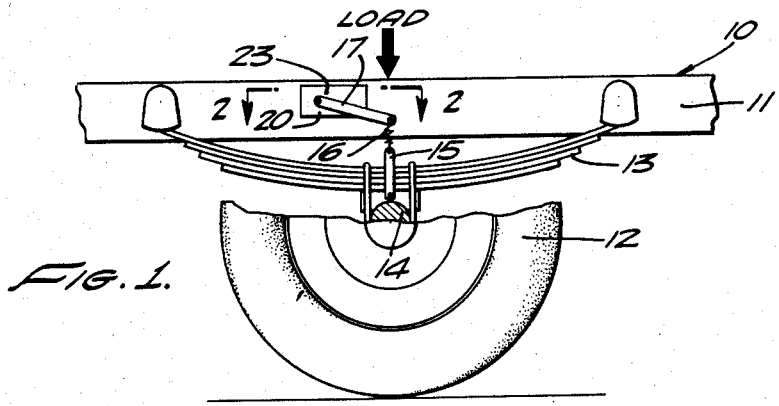
FIGURE 1 is a side elevation partly broken away showing part of a wheeled vehicle and showing a preferred embodiment of this invention.
Figure 2:
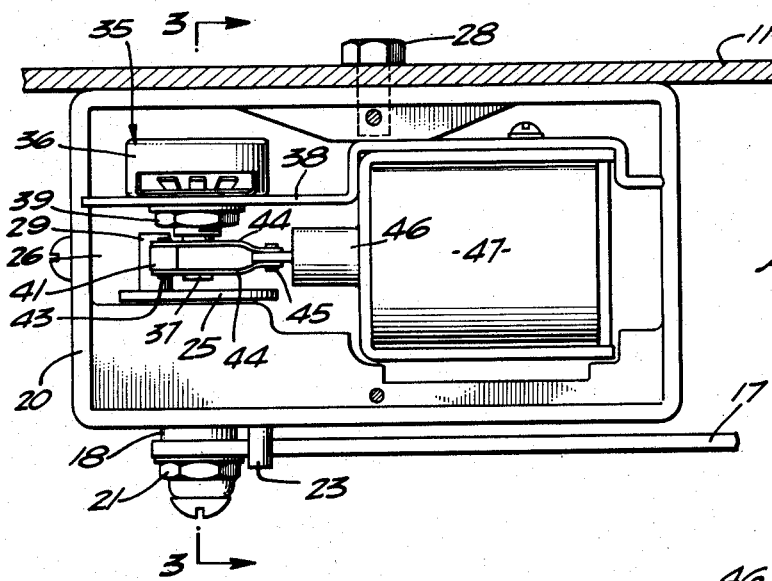
FIGURE 2 is a plan view partly in section taken substantially along lines 2—2 on FIGURE 1.

Referring to the drawings, the vehicle, generally designated 10, is provided with a frame 11 mounted on wheels 12 by means of springs 13 and axles 14. The vehicle may, for example, comprise a conventional highway truck having a spring associated with each of its wheels. Means are provided for measuring the deflection of each spring under load.

Figure 3:
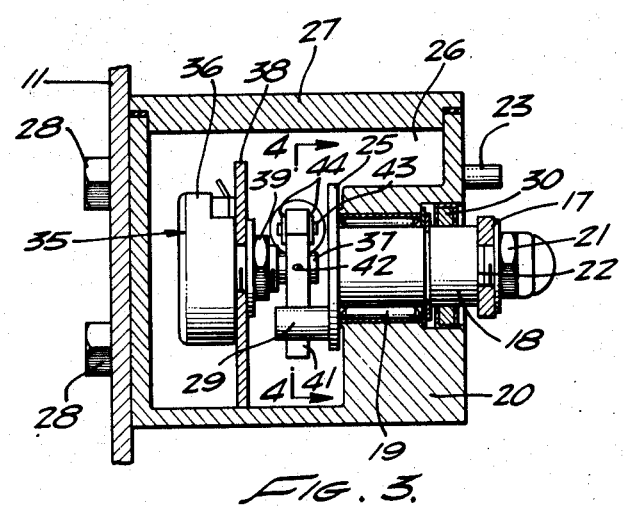
FIGURE 3 is a sectional elevation taken substantially along lines 3—3 on FIGURE 2.

As shown in FIGURE 1 the spring 13 associated with each wheel is connected by a link 15 and overtravel spring 16 to an arm 17. The arm 17 is mounted to turn on the frame 11 and, as shown in FIGURE 3 of the drawings, the arm 17 is fixed on a shaft 18 mounted by means of a roller bearing assembly 19 on a housing 20. The nut 21 serves to hold arm 17 against the shoulder 22 on the shaft 18. A stop pin 23 fixed on the housing limits upward travel of the arm 17.

A flange 25 is fixed on the shaft 18 within the enclosure 26 provided within the housing 20. The upper portion of this enclosure 26 is sealed by means of the cover plate 27. Threaded fastenings 28 secure the housing 20 to the frame 11. A projecting part 29 is fixed on the flange 25 and turns with the shaft 18 and arm 17. It will be understood from this description that the arm 17, shaft 18 and projecting part 29 oscillate continuously while the loaded vehicle 10 rolls along a bumpy road.

Figure 4:
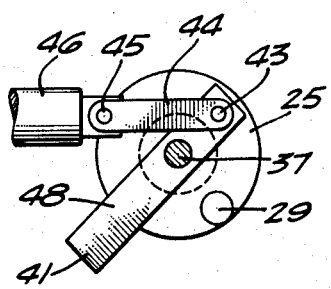
FIGURE 4 is a fragmentary view taken substantially along lines 4—4 as shown in FIGURE 3.

Means are provided for indicating the relative position of projecting part 29 in its arcuate path of travel, which means are selectively operable and hence function only when measurement of the load is required. As shown in the drawings this means includes a potentiometer, generally designated 35, provided with a case 36 and having a rotary shaft 37 projecting therefrom on the shaft 18. The case 36 is supported within the enclosure 26 on the housing plate 38 and is fixed in position by means of the nut 39. A lever 41 is fixed to the potentiometer shaft 37 by any convenient means such as, for example, by the pin 42. One end of the lever 41 is pin-connected at 43 to the parallel links 44 which straddle the lever. The links 44 are pin-connected at 45 to the armature 46 of an electrically operated solenoid 47. When electrical energy is supplied to the solenoid 47 the armature 46 is retracted to the left as viewed in FIGURE 4 with the result that the lever 41 is turned in a counterclockwise direction until the surface 48 of the lever engages the projecting part 29 of the flange 25. When the supply of electrical energy is cut off the armature of each solenoid floats free.

Referring now to the wiring diagram FIGURE 5, it may be observed that electrical power is taken from the plus side of the truck battery 50 and delivered to each of the dividing potentiometers 35, and to each of the solenoids 47. The other lead of the potentiometers 35 is grounded to the frame 11 of the vehicle. The center taps of these potentiometers 35 are wired to meter adjusting potentiometers 51 and 52 for minimum and maximum meter deflections. The adjusting potentiometers 51 and 52 are connected to selector switch 55, which is used to select the desired wheel to be examined or combination of rear or front wheels or total load. The entire system may be actuated by a single push button 56, and the meter 54 is calibrated in units of weight.

In operation, one of the devices, as illustrated in FIGURES 1–4, is mounted on the frame adjacent one of the wheel springs. The enclosure 26 provided by the housing 20 and cover 27 of each of the assemblies protects the moving parts and excludes foreign matter. The sealed ring 30 encircles the shaft 18 where it emerges from the housing 20. The potentiometer shafts 37 remain at rest while the vehicle travels down the highway because of the lost-motion connection between the lever 41 and the projecting part 29. The part 29 oscillates in an arc as the actuating arm 17 is moved by variations in deflection of the load spring 13. The extent of arcuate travel of the projecting part 29 is insufficient to bring it into contact with the lever 41. When it is desired to measure the load on each wheel or combinations of wheels on the vehicle, the selector switch 55 and the push button 56 are actuated. While the vehicle is usually at rest at this time, this is not essential, and readings may be made while the vehicle is in motion, if desired.

Actuation of the push button 56 causes solenoids 47 to retract their respective armatures 46 in each device thereby swinging the lever 41 in that device into contact with the projecting part 29. The position of the potentiometer shaft 47 corresponding to engagement of the arm surface 48 with the part 29 divides the applied voltage and the meter reading provides a measure of the load. When the push button 56 is released, the armatures 46 stop exerting force and merely float free. Subsequent rocking movements of the arm 17 and projecting part 29 serve to move the armature toward extended position, and thereby move the lever 41 clockwise as viewed in FIGURE 4, until the part 29 no longer contacts the lever 41 at the end of its arcuate travel.

The first position of the selector switch 55 is blank, and none of the potentiometers 35 is connected to the meter 54. The second position reflects the load on the left front, the third relates to the right front, the fourth to the left rear, the fifth to the right rear, the sixth to the total load on the front, the seventh to the total load on the rear, and the eighth position shows the total load on all four wheels.

Although only one form of the invention has been illustrated and described in detail, it will be apparent to those skilled in the art that various modifications may be made without departing from the scope of the appended claims.

I claim:

1. For use with a load-carrying vehicle having springs supporting a frame, a load measuring and indicating device comprising in combination: an arm mounted for turning movement on the vehicle frame and having a contact part secured thereto, linkage for moving said arm in accordance with deflection of a vehicle spring under load, a potentiometer having a moving element mounted to turn co-axially of said arm, electrical means for indicating the position of said moving element, and means including an electrical solenoid for selectively moving said element into engagement with said contact part.

2. For use with a load-carrying vehicle having springs supporting a frame, a load measuring and indicating device comprising in combination: an arm mounted for turning movement on the vehicle frame and having a contact part secured thereto, means for moving said arm in accordance with deflection of a vehicle spring under load, a potentiometer having a moving element mounted to turn co-axially of said arm, electrical means for indicating the position of said moving element, and means including an electrical solenoid for selectively turning said element to engage said contact part.

3. For use with a load-carrying vehicle having springs supporting a frame, a load measuring and indicating device comprising in combination: an arm mounted for turning movement on the vehicle frame and having a contact part secured thereto, means for moving said arm in accordance with deflection of a vehicle spring under load, a potentiometer having a moving lever mounted to turn co-axially of said arm, electrical means including a meter connected to indicate the position of said moving lever, and means including an electrical solenoid for selectively turning said lever to engage said contact part.

4. For use with a load-carrying vehicle having springs supporting a frame, a load measuring and indicating device comprising in combination: an arm mounted for turning movement on the vehicle frame and having a contact pin secured thereto, linkage for moving said arm in accordance with deflection of a vehicle spring under load, a potentiometer having a moving lever mounted to turn co-axially of said arm, electrical means for indicating the position of said moving lever, and means including an electrical solenoid for selectively turning said lever to engage said pin.

References Cited in the file of this patent

UNITED STATES PATENTS

| | | |
|---|---|---|
| 2,813,709 | Brier | Nov. 19, 1957 |
| 3,044,563 | Gumpertz et al. | July 17, 1962 |
| 3,092,818 | Potschka | June 4, 1963 |